United States Patent
Krishnaiah et al.

(10) Patent No.: US 9,417,098 B2
(45) Date of Patent: Aug. 16, 2016

(54) STATIONARY MAGNET VARIABLE RELUCTANCE MAGNETIC SENSORS

(75) Inventors: Girish Krishnaiah, Karanataka (IN); Gangi Reddy Rajula, Andhrapradesh (IN); Bharath Mahalingam, Karanataka (IN); Vijayshekhar Araganji, Karanataka (IN); Sivasubramanian Srinivasan, Karanataka (IN); John Kenneth Tillotson, Petosky, MI (US); James Sorenson, Morristown, NJ (US); Danial Lewis Kosht, Gaylord, MI (US)

(73) Assignee: Honeywell International Inc., Morris Plains, NJ (US)

( * ) Notice: Subject to any disclaimer, the term of this patent is extended or adjusted under 35 U.S.C. 154(b) by 1251 days.

(21) Appl. No.: 13/185,385

(22) Filed: Jul. 18, 2011

(65) Prior Publication Data
US 2013/0021025 A1    Jan. 24, 2013

(51) Int. Cl.
*G01B 7/30*    (2006.01)
*G01D 5/14*    (2006.01)

(52) U.S. Cl.
CPC . *G01D 5/145* (2013.01); *G01B 7/30* (2013.01)

(58) Field of Classification Search
CPC .... G01R 15/20; G01R 15/202; G01R 15/205; G01D 5/14; G01D 5/142; G01D 5/145; G01D 5/147; G01D 5/16; G01D 5/20; G01D 5/2006; G01D 5/2013; G01D 5/202; G01D 5/2026; G01D 5/2033; G01D 5/204; G01D 5/2046; G01D 5/2053; G01D 5/2283; G01D 5/206; G01D 5/22; G01D 5/2208; G01D 5/2216; G01D 5/2225; G01D 5/2233; G01D 5/2241; G01D 5/225; G01D 5/2258; G01D 5/2266; G01D 5/2275; G01B 7/02; G01B 7/023; G01B 7/04; G01B 7/046; G01B 7/14; G01B 7/305; G01B 7/31; G01B 7/312; G01B 7/30

USPC .................................................. 324/207.25
See application file for complete search history.

(56) References Cited

U.S. PATENT DOCUMENTS

| | | | | |
|---|---|---|---|---|
| 4,604,575 A | * | 8/1986 | Shimizu ................. | G01D 5/243 318/653 |
| 5,223,760 A | * | 6/1993 | Peck et al. .................... | 310/168 |

(Continued)

FOREIGN PATENT DOCUMENTS

EP    1707922 A1    10/2006

OTHER PUBLICATIONS

EP Search Report for EP 12176460.9-2213 dated Nov. 19, 2012.
(Continued)

*Primary Examiner* — Jay Patidar
*Assistant Examiner* — David M. Schindler
(74) *Attorney, Agent, or Firm* — Conley Rose, P.C.; Kristin Jordan Harkins (57) ABSTRACT

A position sensor for sensing whether a rotatable element is in at least a first rotational position or a second rotational position is provided. A rotor is configured to be coupled to the rotatable element for rotation therewith, and is constructed at least partially of a magnetically permeable material and includes a first rotor pole. A stator is non-rotationally mounted, is constructed at least partially of a magnetically permeable material, is spaced apart from the rotor, and comprises a first main pole and a first stealer pole. The first main pole and the first stealer pole are spaced radially apart from each other. A magnet is non-rotationally disposed adjacent to the stator and is spaced apart from the rotor. A first magnetic sensor is non-rotationally mounted between the stator and the rotor, is disposed adjacent the first main pole, and is radially offset from the first stealer pole.

7 Claims, 10 Drawing Sheets

(56) References Cited

U.S. PATENT DOCUMENTS

| | | | |
|---|---|---|---|
| 5,436,560 A * | 7/1995 | Murakami | 324/207.21 |
| 6,472,863 B1 * | 10/2002 | Garcia | 324/173 |
| RE39,748 E * | 7/2007 | Watanabe | 310/112 |
| 2002/0036495 A1 | 3/2002 | Hannewald et al. | |
| 2005/0104581 A1 * | 5/2005 | Miyata et al. | 324/207.25 |
| 2006/0220638 A1 * | 10/2006 | Urquidi et al. | 324/207.25 |
| 2007/0108968 A1 * | 5/2007 | Ootawara et al. | 324/207.25 |
| 2010/0219725 A1 * | 9/2010 | Yamagata | H02K 7/116 310/68 B |

OTHER PUBLICATIONS

EP Communication for EP 12176460.9-2213 dated Nov. 30, 2012

* cited by examiner

STATIONARY MAGNET VARIABLE RELUCTANCE MAGNETIC SENSORS

TECHNICAL FIELD

The present invention generally relates to sensors, and more particularly relates to variable reluctance magnetic sensors that use stationary magnets.

BACKGROUND

Various sensors have been developed to sense the rotational position of various rotational elements. For example, various sensors have been developed to sense the position of a valve. In particular, various types of sensors have been developed to sense when a valve is in its closed position and in one or more open positions. One of the more popular types of sensors used to sense valve position is a mechanical switch. Typically, this type of sensor is mounted such that, as the valve is rotated, the valve shaft (or other suitable component) contacts the mechanical switch at the closed position and/or one or more open positions to trigger an electrical circuit. Although mechanical switches, as well as numerous other sensor types, generally work well, the reliability of these sensors may not be sufficiently high for certain applications and/or industries, such as the aerospace industry. This is due, in part, to the repeated mechanical contact that occurs during operation.

Hence, there is a need for a sensor that can sense the rotational position of a rotational element, such as a valve, that does not rely on mechanical contact, and thus exhibits relatively high reliability. The present invention addresses at least this need.

BRIEF SUMMARY

In one embodiment, a position sensor for sensing whether a rotatable element is in at least a first rotational position or a second rotational position includes a rotor, a stator, a magnet, and a first magnetic sensor. The rotor is configured to be coupled to the rotatable element for rotation therewith, and is constructed at least partially of a magnetically permeable material and including a first rotor pole. The stator is non-rotationally mounted and is constructed at least partially of a magnetically permeable material. The stator is spaced apart from the rotor and comprises a first main pole and a first stealer pole. The first main pole and the first stealer pole are spaced radially apart from each other. The magnet is non-rotationally disposed adjacent to the stator and is spaced apart from the rotor. The first magnetic sensor is non-rotationally mounted between the stator and the rotor, is disposed adjacent the first main pole, and is radially offset from the first stealer pole.

In another embodiment, a position sensor for sensing whether a rotatable element is in at least a first rotational position or a second rotational position includes a rotor, a stator, a magnet, a first magnetic sensor, and a second magnetic sensor. The rotor is configured to be coupled to the rotatable element for rotation therewith, is constructed at least partially of a magnetically permeable material, and includes a first rotor pole. The stator is non-rotationally mounted, is constructed at least partially of a magnetically permeable material, is spaced apart from the rotor, and includes a first stator pole and a second stator pole. The first stator pole and the second stator pole are spaced radially apart from each other. The magnet is non-rotationally disposed adjacent to the stator and is spaced apart from the rotor. The first magnetic sensor is non-rotationally mounted between the stator and the rotor, is disposed adjacent the first stator pole, and is radially offset from the second stator pole. The second magnetic sensor is non-rotationally mounted between the stator and the rotor, is disposed adjacent the second main pole, and is radially offset from the first stator pole.

In yet another embodiment, a rotational sensor for sensing a rotational position or rotational speed of a rotatable element includes a rotor, a stator, a magnetic sensor, a first magnet, and a second magnet. The rotor is configured to be coupled to the rotatable element for rotation therewith, is constructed at least partially of a magnetically permeable material, and includes a first rotor pole. The stator is non-rotationally mounted, is constructed at least partially of a magnetically permeable material, and is spaced apart from the rotor. The magnetic sensor is non-rotationally mounted between the rotor and the stator. The first magnet is coupled to the stator and has its north magnetic pole directed toward the stator and its south magnetic pole directed toward the rotor. The second magnet is coupled to the stator and is radially offset from the first magnet. The second magnet has its south magnetic pole directed toward the stator and its north magnetic pole directed toward the rotor.

Furthermore, other desirable features and characteristics of the sensors disclosed herein will become apparent from the subsequent detailed description and the appended claims, taken in conjunction with the accompanying drawings and preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary, or the following detailed description.

As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Moreover, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements. Moreover, two elements may simply contact each other.

Figure 1:
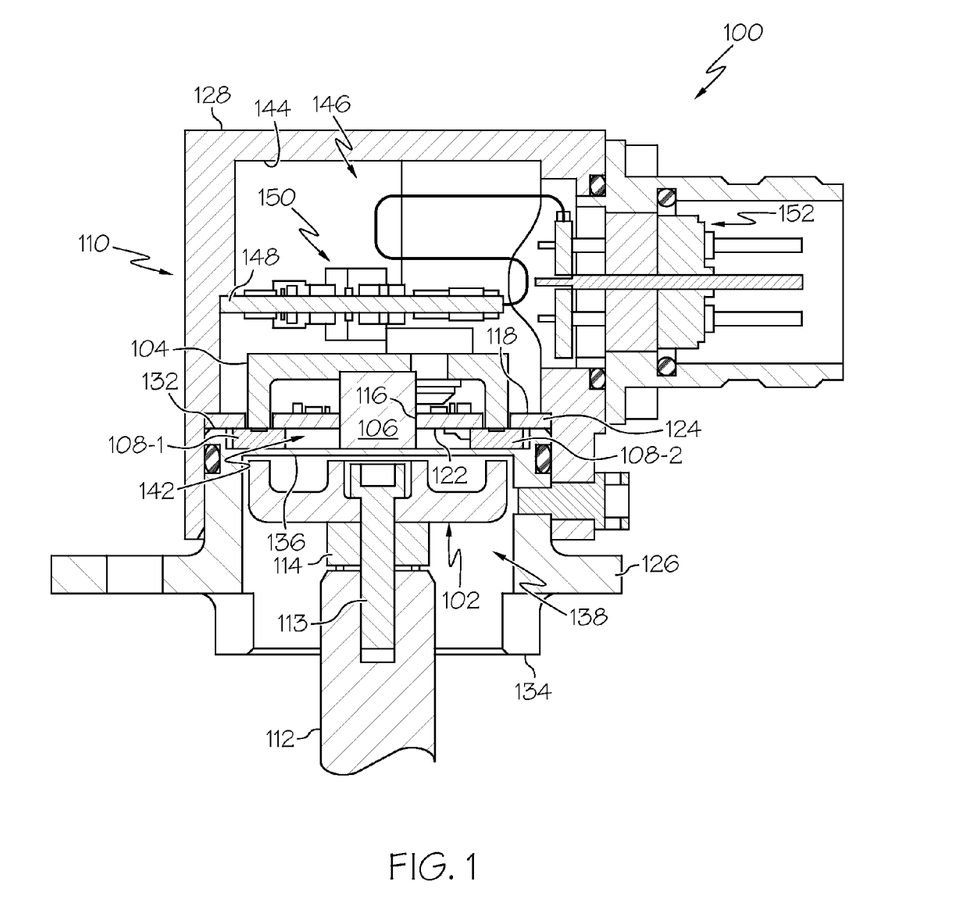
FIG. 1 depicts a cross section view of an embodiment of a position sensor.
Figure 2:
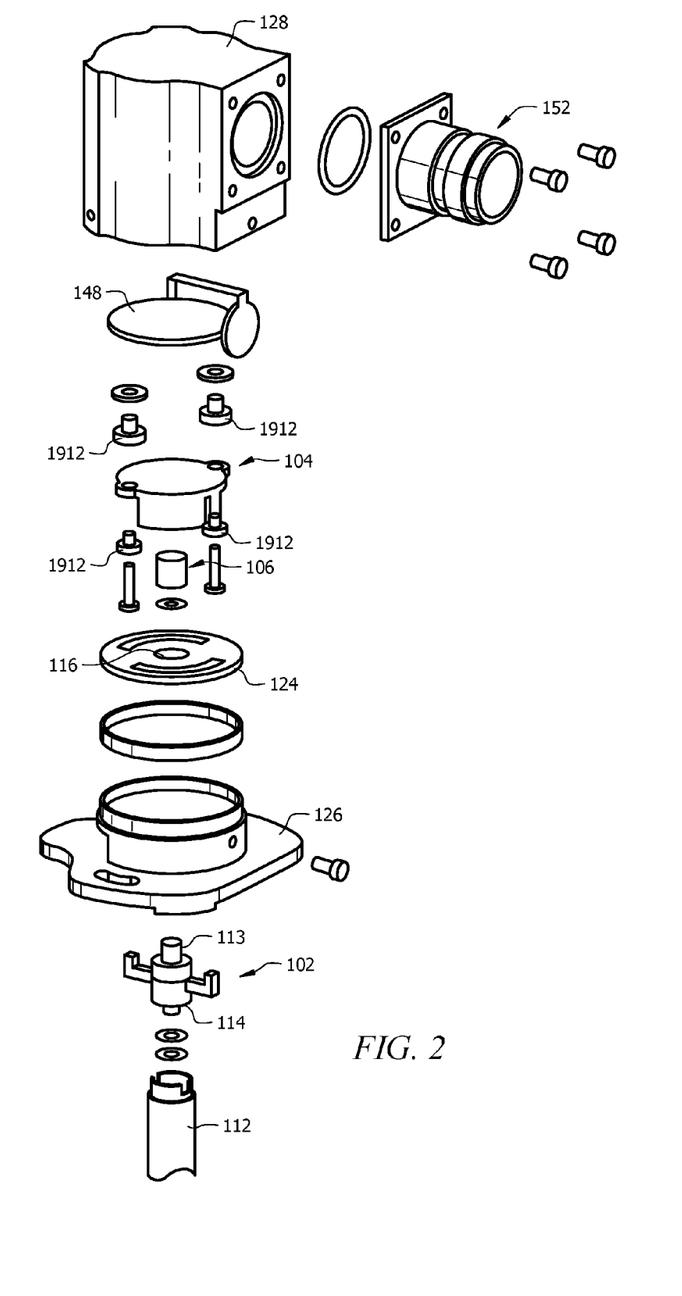
FIG. 2 depicts an exploded view of the position sensor depicted in FIG. 1.

Referring now to FIGS. 1 and 2, a cross section view and an exploded view, respectively, of an embodiment of a position sensor 100 is depicted. The position sensor 100 may be used to sense the rotational position of any one of numerous rotatable elements. In the depicted embodiment, however, it is configured to sense the position of a valve element (not illustrated). It will additionally be appreciated that the sensor 100 may be configured to sense whether the valve element is in one or multiple positions. However, the depicted sensor 100 is configured to sensing whether the valve element is in a first rotational position or a second rotational position.

To implement the above-described functionality, the position sensor 100 includes a rotor 102, a stator 104, a magnet 106, and one or more magnetic sensors 108, all preferably disposed within a housing assembly 110. The rotor 102 is coupled to the non-illustrated valve element via a valve shaft 112, and is thus rotatable with the valve shaft 112 and valve element. The rotor 102 is constructed at least partially of a magnetically permeable material, such as a ferrous material, and included one or more rotor poles. As shown most clearly in FIG. 3, the rotor 102, at least in the depicted embodiment, is implemented with two rotor poles—a first rotor pole 302-1 and a second rotor pole 302-2—that are diametrically opposed to each other. It will be appreciated that in other embodiments, the rotor 102 could be implemented with more or less than two rotor poles 302.

Figure 3:
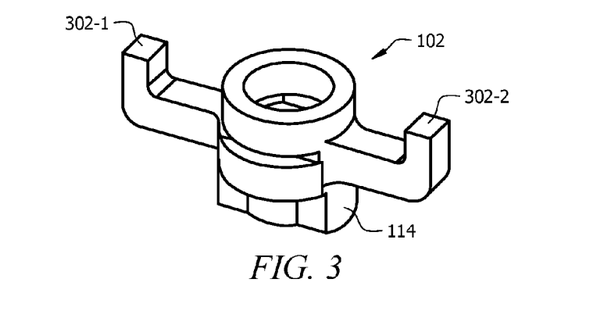
FIG. 3 depicts a plan view of a rotor that may be used to implement the position sensor of FIGS. 1 and 2.

As FIGS. 1-3 also depict, the rotor 102 is coupled to the valve shaft 112 via a fastener 113 and a rotor-to-shaft interface 114. The fastener 113 and rotor-to-shaft interface 114 are preferably constructed of a non-magnetically permeable material, to thereby magnetically isolate the valve shaft 112 (and other potentially magnetically permeable elements) from the rotor 102. Thus, as will be described further below, magnetic flux from the magnet 106 is constrained to the rotor 102, stator 104, and one or more magnetic sensors 108.

The stator 104 is non-rotationally mounted within the housing assembly 110, and is constructed, at least partially, of a magnetically permeable material. The stator 104 is spaced apart from the rotor 102, and includes one or more main poles and one or more secondary poles (referred to hereinafter as "stealer poles"). As shown most clearly in FIG. 4, the stator 104, at least in the depicted embodiment, includes a base 402, two main poles 404, and two stealer poles 406. The main poles 404, which are referred to herein as a first main pole 404-1 and a second main pole 404-2, are diametrically opposed to each other and extend perpendicularly from the base 402 toward the rotor 102. Similarly, the stealer poles 406, which are referred to herein as a first stealer pole 406-1 and a second stealer pole 406-2, are also diametrically opposed to each other and extend perpendicularly from the base 402 toward the rotor 102. It will be appreciated that in other embodiments, the stator 104 could be implemented with more or less than two main poles 404 and with more or less than two stealer poles 406. Preferably, however, the sensor 100 is implemented with equal numbers of rotor poles 302, main poles 404, and stealer poles 406.

Figure 4:
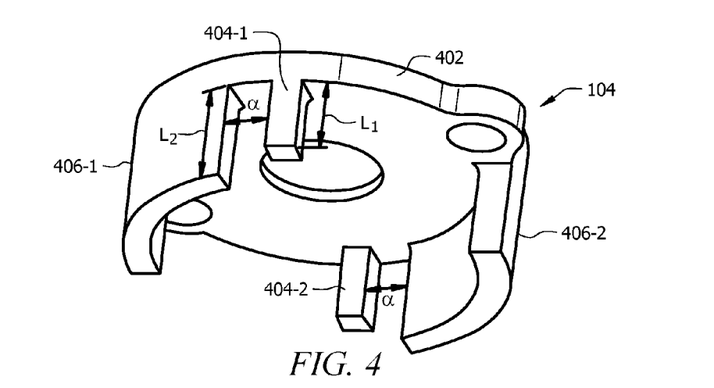
FIG. 4 depicts a plan view of a stator that may be used to implement the position sensor of FIGS. 1 and 2.

No matter the specific number of main poles 404 and stealer poles 406, it is seen that the first main pole 404-1 and the first stealer pole 406-1 are spaced radially apart from each other by a predetermined angular distance ($\alpha$). Similarly, the second main pole 404-2 and the second stealer pole 406-2 are spaced radially apart from each other by the same predetermined angular distance ($\alpha$). It will be appreciated that the predetermined angular distance ($\alpha$) may vary, as needed or desired. The main poles 404 and stealer poles 406 each extend a predetermined length from the base 402. In particular, the main poles 404 extend a first predetermined distance ($L_1$), and the stealer poles 406 extend a greater, second predetermined distance ($L_2$). As may be appreciated, the first predetermined length is less than the second because, as clearly shown in FIG. 1, the one or more magnetic sensors 108 are disposed, one each, under the main poles 404.

Figure 5:
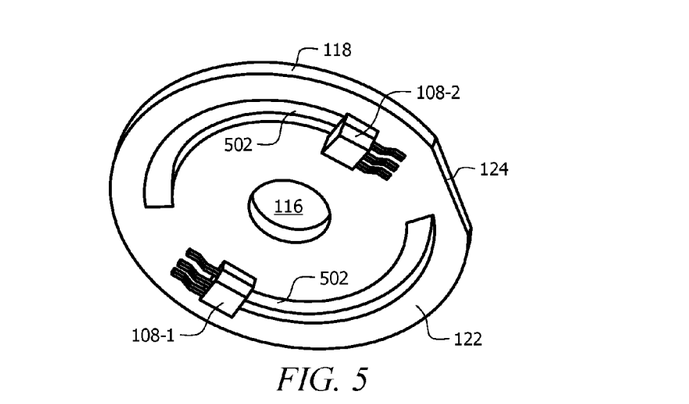
FIG. 5 depicts a plan view of a sensor printed circuit board (PCB) that may be used to implement the position sensor of FIGS. 1 and 2.
Figure 6:
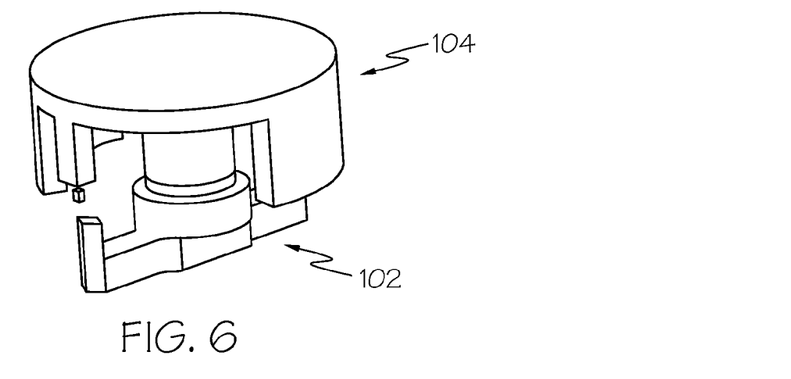
FIGS. 6-11 depict various alternative implementations of the stator and rotor depicted in FIGS. 2 and 3.
Figure 7:
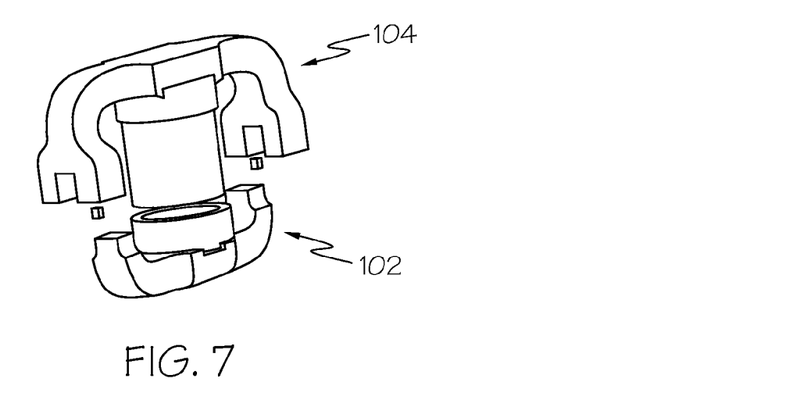
Figure 8:
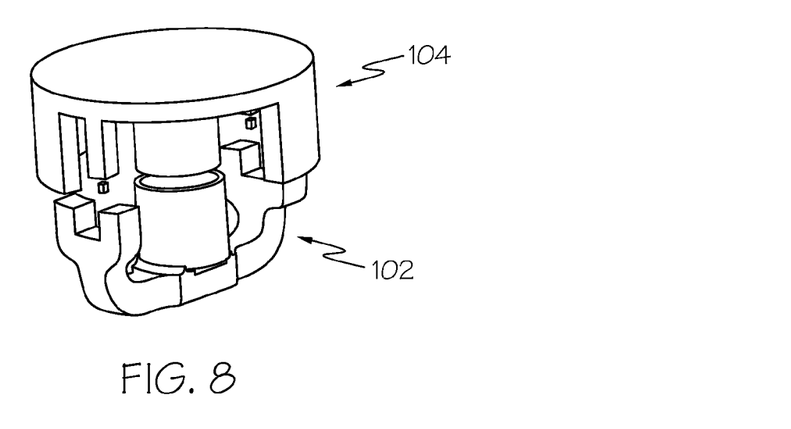
Figure 9:
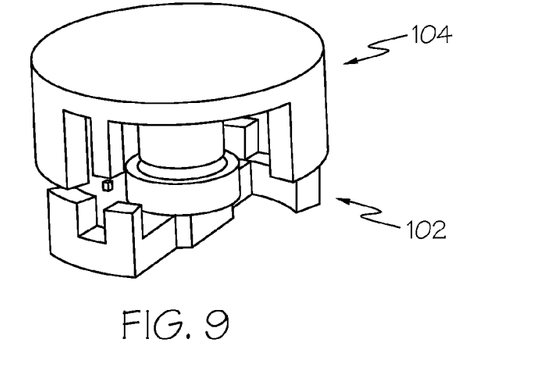
Figure 10:
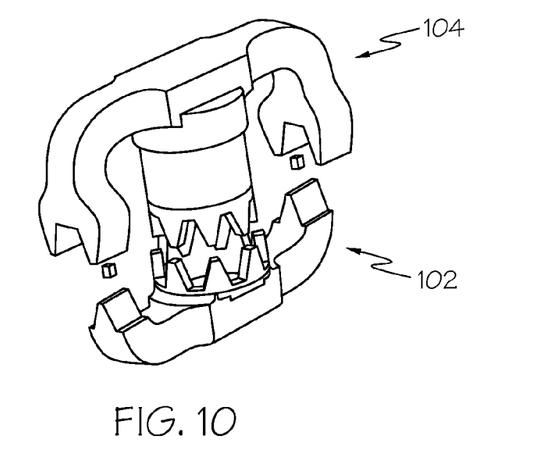
Figure 11:
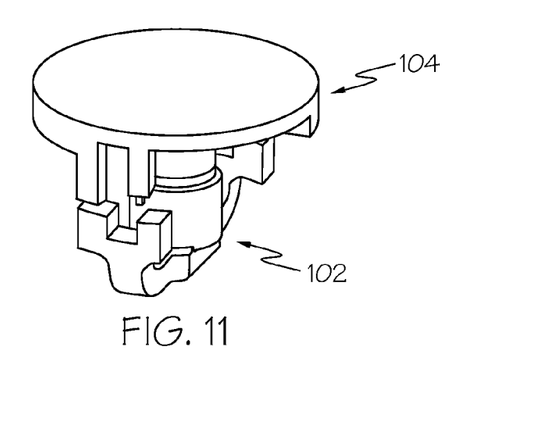

The magnet 106 is non-rotationally coupled to, or at least disposed adjacent to, the stator 104, and is spaced apart from the rotor 102. More specifically, the magnet 106 is at least disposed adjacent to the central portion of the base 402, and is thus symmetrically disposed relative to each of the main poles 404 and each of the stealer poles 406. The depicted magnet 106 is cylindrical in shape, though any one of numerous other shapes may also be used. In the depicted embodiment, the magnet 106 extends through an opening 116 that extends between a first side 118 and a second side 122 of a sensor printed circuit board (PCB) 124 that is disposed within, and held in place by, the housing assembly 110. As FIG. 5 depicts most clearly, the sensor PCB 124 additionally includes a pair of pole slots 502. The pole slots 502 also extend between the first and second sides 118, 122 and are located and dimensioned so that, when the sensor 100 is assembled, the main poles 404 each extend partially into a different one of the pole slots 502, and the stealer poles 406 each extend completely through a different one of the pole slots 502.

The sensor 100, as noted above, also includes one or more magnetic sensors 108. In the depicted embodiment, the sensor 100 includes two magnetic sensors—a first magnetic sensor 108-1 and a second magnetic sensor 108-2—though it could include more or less than this number of magnetic sensors 108. Preferably, the sensor 100 will be implemented with equal numbers of magnetic sensors 108, rotor poles 302, main poles 404, and stealer poles 406. The magnetic sensors 108 may be implemented using any one of numerous types of sensors that are sensitive to magnetic field flux. In the depicted embodiment, the magnetic sensors 108 are implemented using Hall sensors. Some non-limiting examples of alternative magnetic sensors 108 include anisotropic magneto-resistive (AMR) sensors, giant magneto-resistive (GMR) sensors, and tunneling magneto-resistive (TMR) sensors.

No matter the specific number and type of sensors that are used, the magnetic sensors 108 are non-rotationally mounted between the rotor 102 and the stator 104. The magnetic sensors 108 may be variously mounted, but in the depicted embodiment, which is illustrated most clearly in FIG. 5, each magnetic sensor 108 is coupled to the second side 122 of the sensor PCB 124. Moreover, the magnetic sensors 108 are each disposed adjacent a different one of the main poles 404, via a different one of the pole slots 502, and are radially offset from each of the stealer poles 406. The magnetic sensors 108 are thus symmetrically disposed relative to the magnet 106.

As noted above, the rotor 102, stator 104, magnet 106, and one or more magnetic sensors 108, are all preferably disposed within the housing assembly 110. The housing assembly 110, at least in the depicted embodiment, includes a first housing section 126 and a second housing section 128. The first housing section 126 has a first end 132, a second end 134, and a divider plate 136. The divider plate 136 is disposed between the first end 132 and the second end 134 to define a rotor cavity 138 and a stator cavity 142 within the first housing section 126. The second housing section 128 is coupled to the first housing section 126, and has an inner surface 144 that defines a second housing section cavity 146. When the sensor 100 is assembled, the rotor 102, fastener 113, and rotor-to-shaft interface 114 are all disposed within the rotor cavity 138. The stator 104 is coupled to the housing 128 and the magnet 106 is coupled to the stator 104. Moreover, the stator 104 and the magnet 106 are dimensioned such that each is partially disposed within both the stator cavity 142 and the second housing section cavity 146.

Before proceeding further, it is noted that the depicted sensor 100 additionally includes a circuit board assembly 148. The circuit board assembly 148 has circuitry 150 mounted thereon and is mounted within the housing assembly 110. The circuitry 150 is electrically coupled to each of the one or more magnetic sensors 108 and to an electrical connector 152. The connector 152, which may be variously configured, allows the sensor 100 to be interfaced to external, non-illustrated systems.

The stator 104, as noted above, is non-rotationally mounted within the housing assembly 110, the ends of each of the main poles 404 are disposed adjacent one of the magnetic sensors 108, and the stealer poles 406 are disposed at an offset angle relative to the magnetic sensors 108. When the valve shaft 112 (and thus the non-illustrated valve element) is in a first position, such as a valve-closed position, the rotor poles 302, main poles 404, and magnetic sensors 108 are aligned. As a result, the magnetic sensors 108 detect the magnetic flux that is routed from the magnet 106, through the main poles 404 and the rotor poles 302, and generate voltage signals representative of the magnitude of the magnetic flux density.

As the rotor 102 is rotated from the first position toward a second position, such as a valve-open position, the rotor poles 302 are rotated out of alignment with the main poles 404 and magnetic sensors 108, and into alignment with the stealer poles 406. This results in a significant reduction in the magnetic flux density sensed by the magnetic sensors 108. This reduction in magnetic flux density results in a concomitant reduction in the voltage signals supplied from the magnetic sensors 108.

The voltage signals generated by the magnetic sensors 108 are supplied to the circuitry 150 that is mounted on the circuit board assembly 148. The circuitry 150 processes the voltages signals, and supplies a position signal representative of the position of the valve. The valve position signal may be used to indicate whether the valve is in the closed or a "not-closed" position (e.g., any open position), whether the valve is in the closed position or the full-open position, or the closed position or any one of numerous open positions.

The configuration of the above-described sensor 100 results in a closed-loop routing of the magnetic flux through the rotor 102, stator 104, and magnetic sensors 108, and concentrates the magnetic field within the sensor 100. This provides magnetic shielding for various external systems that may be susceptible to the magnetic field from the magnet 106. It is noted that the position of the magnetic sensors 108 relative to the main poles 404 may be varied to adjust the sensitivity of the sensor. It will additionally be appreciated that the geometries of the rotor 102 and stator 104 may be varied to achieve different sensitivity. Some non-limiting examples of various alternative geometries are depicted in FIGS. 6-11.

Figure 12:
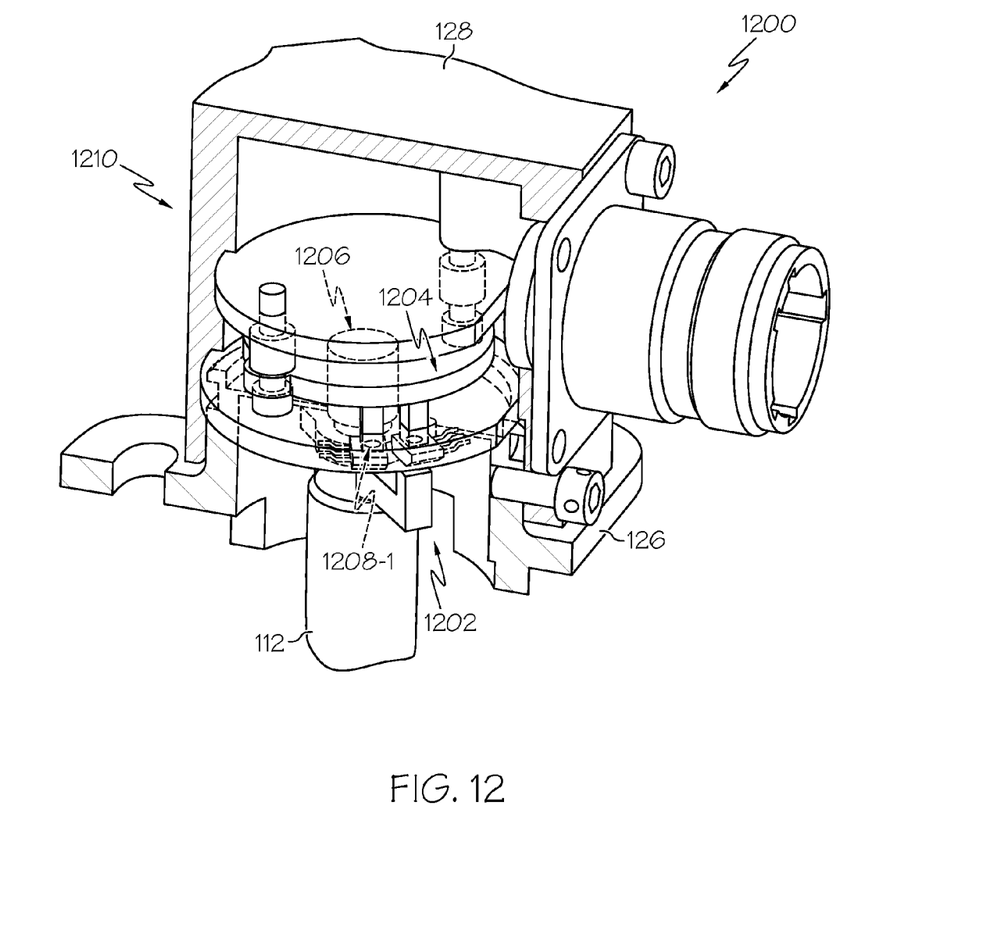
FIG. 12 depicts a cut-away plan view of an alternative embodiment of a position sensor.

Referring now to FIG. 12, an alternative embodiment of a variable reluctance magnetic sensor 1200 is depicted and will be described. The depicted sensor 1200 is configured similarly to the embodiment described above, in that it includes a rotor 1202, a stator 1204, and a magnet 1206, all preferably disposed within a housing assembly 1210. The configuration, arrangement, and construction of the rotor 1202, the magnet 1206, and the housing assembly 1210 are all at least substantially similar to those used to implement the above-described embodiment. Descriptions of the rotor 1202, magnet 1206, and housing assembly 1210 will, therefore, not be repeated. However, the stator 1204 that is used in the depicted embodiment is configured differently. Moreover, unlike the previously-described embodiment, the depicted sensor 1200 includes one or more pair of magnetic sensors 1208. Thus, detailed descriptions of the stator 1204 and magnetic sensors 1208 will be provided, beginning first with the stator 1204. It should be noted that like reference numerals in FIGS. 1-5 and 12-14 refer to like components.

The stator 1204 is non-rotationally mounted within the housing assembly 1210, and is constructed, at least partially, of a magnetically permeable material. The stator 1204 is spaced apart from the rotor 1202, and includes one or more pair of stator poles. As shown most clearly in FIG. 13, the stator 1204, at least in the depicted embodiment, includes a base 1302, a first pair of stator poles 1304 and a second pair of stator poles 1306. The first pair of stator poles 1304 includes a first stator pole 1304-1 and a second stator pole 1304-2, and the second pair of stator poles 1306 includes a third stator pole 1306-1 and a fourth stator pole 1306-2. The first and second stator poles 1304-1, 1304-2 are radially spaced apart from each other, as are the third and fourth stator poles 1306-1, 1306-2. Moreover, the first 1304-1 and third 1306-1 stator poles are diametrically opposed to each other, as are the second 1304-2 and fourth 1306-2 stator poles. The first and second pair of stator poles 1304, 1306 extend perpendicularly from the base 1302 toward the rotor 1202. It will be appreciated that in other embodiments, the stator 1204 could be implemented with more or less than two pair of stator poles 1304, 1306. Preferably, however, the sensor 1200 is implemented with equal numbers of rotor poles and stator pole pairs.

Figure 13:
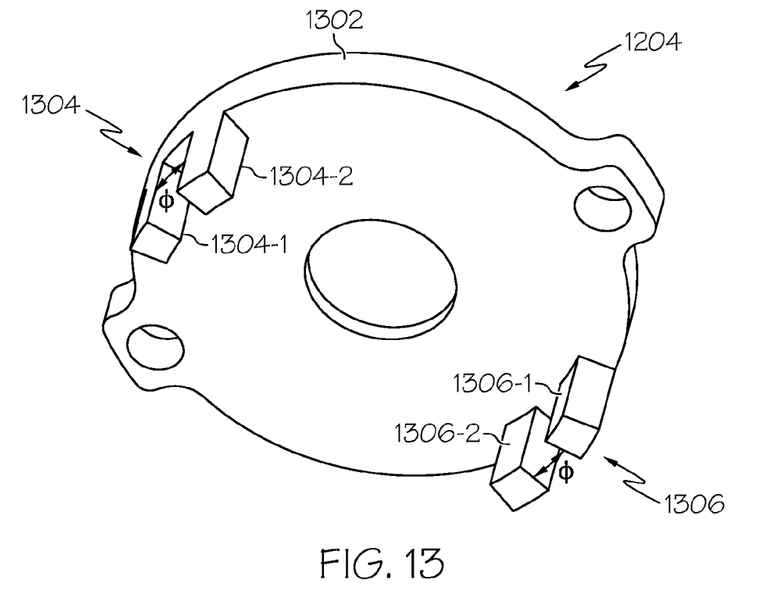
FIG. 13 depicts a plan view of a stator that may be used to implement the position sensor of FIG. 12.

No matter the specific number of stator pole pairs, the first stator pole 1304-1 and the second stator pole 1304-2 are spaced radially apart from each other by a predetermined angular distance (ϕ). Similarly, the third stator pole 1306-1 and the fourth stator pole 1306-2 are spaced radially apart from each other by the same predetermined angular distance (ϕ). It will be appreciated that the predetermined angular distance (ϕ) may vary, as needed or desired. In this embodiment, the stator poles 1304 all extend the same predetermined length from the base 1302.

The sensor 1200 may include one or more pair of magnetic sensors 1208. In the depicted embodiment, the sensor 1200 includes two pair of magnetic sensors 1208—a first sensor pair 1208-1 and a second sensor pair 1208-2—though it could include more or less than this number of sensor pairs 1208. As shown most clearly in FIG. 14, the first sensor pair 1208-1 includes a first magnetic sensor 1402-1 and a second magnetic sensor 1402-2, and the second sensor pair 1208-2 includes a third magnetic sensor 1402-3 and a fourth magnetic sensor 1402-4. Preferably, the sensor 1200 will be implemented with equal numbers of magnetic sensor pairs, rotor poles, and stator pole pairs. The magnetic sensors 1402 may be implemented using any one of numerous types of sensors that are sensitive to magnetic field flux. In the depicted embodiment, the magnetic sensors 1402 are implemented using Hall sensors. Some non-limiting examples of alternative magnetic sensors include anisotropic magneto-resistive (AMR) sensors, giant magneto-resistive (GMR) sensors, and tunneling magneto-resistive (TMR) sensors.

No matter the specific number of sensor pairs, and the type of magnetic sensors 1402 that are used, each sensor pair 1208-1, 1208-2 is non-rotationally mounted between the rotor 1202 and the stator 1204. The magnetic sensors 1402 may be variously mounted, but in the depicted embodiment, which is illustrated most clearly in FIG. 14, each magnetic sensor 1402 is coupled to the second side 122 of the sensor PCB 124. Moreover, the first and second magnetic sensors 1402-1, 1402-2 are disposed adjacent the first and second stator poles 1304-1, 1304-2, respectively, via one of the pole slots 502, and the third and fourth magnetic sensors 1402-3, 1402-4 are disposed adjacent the third and fourth stator poles 1306-1, 1306-2, respectively, via the other one of the pole slots 502.

Figure 14:
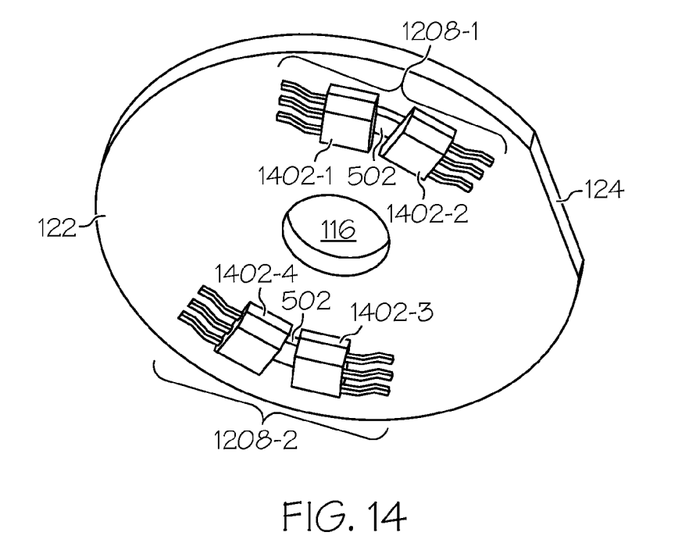
FIG. 14 depicts a plan view of a sensor PCB that may be used to implement the position sensor of FIG. 12.

Thus, the first magnetic sensor 1402-1 is disposed adjacent the first stator pole 1304-1 and is radially offset from the second stator pole 1304-2, whereas the second magnetic sensor 1402-2 is disposed adjacent the second stator pole 1304-2 and is radially offset from the first stator pole 1304-1. Similarly, the third magnetic sensor 1402-3 is disposed adjacent the third stator pole 1306-1 and is radially offset from the fourth stator pole 1306-2, whereas the fourth magnetic sensor 1402-4 is disposed adjacent the fourth stator pole 1306-2 and is radially offset from the third stator pole 1306-1.

When the valve shaft 112 (and thus the non-illustrated valve element) is in a first position, such as a valve-closed position, the first and second rotor poles 302-1, 302-2 are aligned with the first and third stator poles 1304-1, 1306-1, respectively, and with the first and third magnetic sensors 1402-1, 1402-3, respectively. The first and second rotor poles 302-1, 302-2 are concomitantly offset from the second and fourth stator poles 1304-2, 1306-2, respectively, and from the second and fourth magnetic sensors 1402-2, 1402-4, respectively. As a result, the first and third magnetic sensors 1402-1, 1402-3 detect a relatively higher magnetic flux, and thus generate relatively larger magnitude voltage signals, than do the second and fourth magnetic sensors 1402-2, 1402-4.

As the rotor 1202 is rotated from the first position toward a second position, such as a valve-open position, the first and second rotor poles 302-1, 302-2 are rotated out of alignment with the first and third stator poles 1304-1, 1306-1, respectively, and with the first and third magnetic sensors 1402-1, 1402-3, respectively, and into alignment with the second and fourth stator poles 1304-2, 1306-2, respectively, and with the second and fourth magnetic sensors 1402-2, 1402-4, respectively. This results in the first and third magnetic sensors 1402-1, 1402-3 detecting relatively less magnetic flux, and thus generating relatively larger magnitude voltage signals, as the rotor 1202 is rotated, whereas the second and fourth magnetic sensors 1402-2, 1402-4 will detect relatively higher magnetic flux, and thus generate relatively larger magnitude voltage signals.

Figure 15:
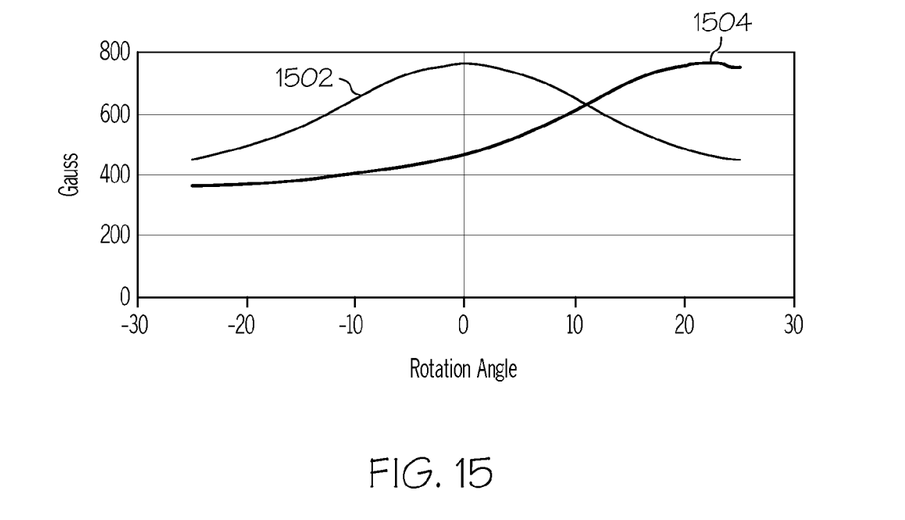
FIG. 15 is a graph of the variations in the magnetic flux detected by magnetic sensors in the sensor of FIG. 12.
Figure 16:
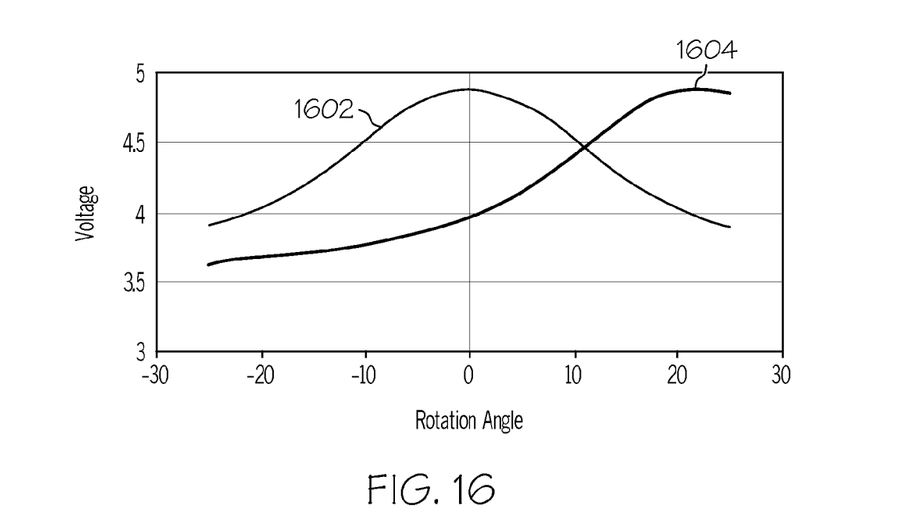
FIG. 16 is a graph of variations in the magnitude of the voltage signals generated by the magnetic sensors in the sensor of FIG. 12.

The variations in magnetic flux detected by the magnetic sensors 1402, and the concomitant variations in the magnitude of the voltage signals generated by the magnetic sensors 1402, are graphically depicted in FIGS. 15 and 16, respectively. In FIG. 15, curve 1502 represents the variations in magnetic flux detected by the first and third magnetic sensors 1402-1, 1402-3, and curve 1504 represents the variations in magnetic flux detected by the second and fourth magnetic sensors 1402-2, 1402-4. In FIG. 16, curve 1602 represents the variations in the magnitude of the voltage signals generated by the first and third magnetic sensors 1402-1, 1402-3, and curve 1604 represents the magnitude of the voltage signals generated by the second and fourth magnetic sensors 1402-2, 1402-4.

The voltage signals generated by the magnetic sensors 1402 are supplied to the circuitry 150 that is mounted on the circuit board assembly 148. The circuitry 150 processes the voltages signals, and supplies a position signal representative of the position of the valve. The valve position signal may be used to indicate whether the valve is in the closed or a "not-closed" position (e.g., any open position), whether the valve is in the closed position or the full-open position, or whether the valve is in the closed position or any one of numerous open positions between the closed and full-open positions. It will be appreciated that the circuitry 150 may be configured to provide an indication of only discrete valve positions, or to provide a continuous indication of valve position as it is rotated between the closed and full-open position.

Figure 17:
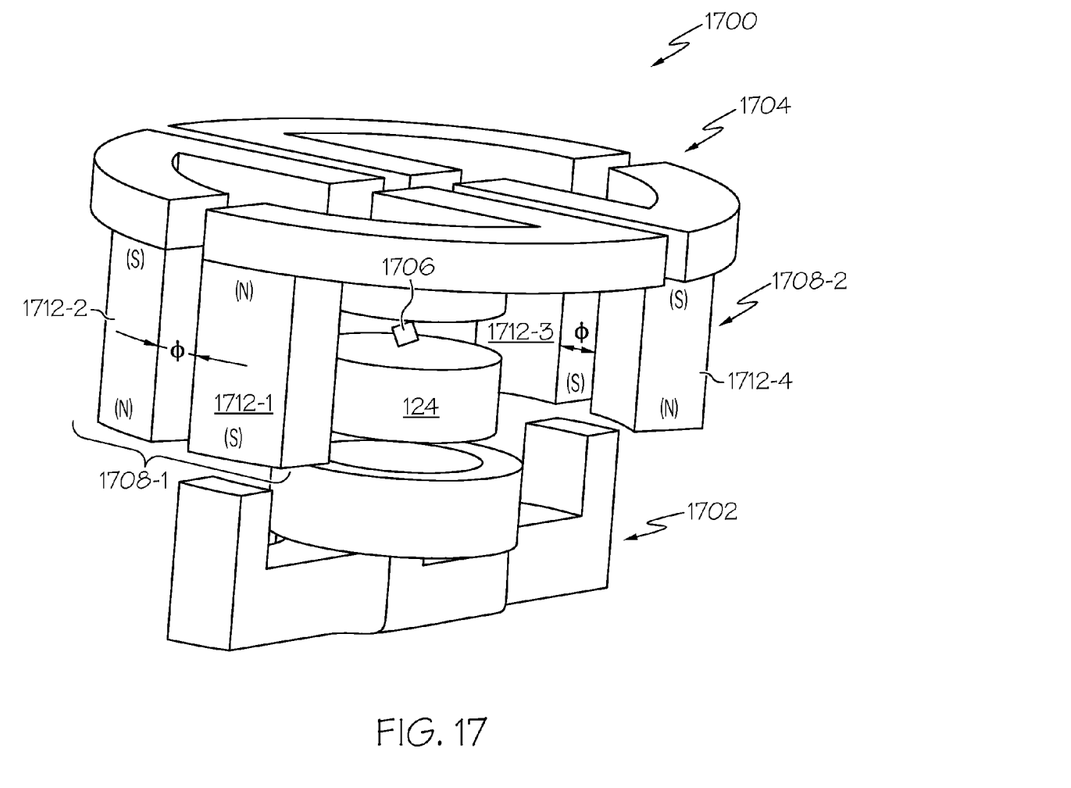
FIG. 17 depicts a plan view of a portion of another alternative embodiment of a sensor.

Referring now to FIG. 17, yet another embodiment of at least a portion of a sensor 1700 is depicted. This sensor embodiment includes a rotor 1702, a stator 1704, a magnetic sensor 1706, and one or more pair of magnets 1708 all mounted within a non-illustrated housing assembly. The configuration, arrangement, and construction of the rotor 1702, the magnetic sensor 1706, and the non-illustrated housing assembly are at least substantially similar to those used to implement the previously described embodiments. Thus, for brevity, detailed descriptions of the rotor 1702, the magnetic sensor 1706, and the housing assembly will not be repeated. Additionally, like reference numerals in FIGS. 1-5, 12-14, and 17 refer to like components.

As with the previously described embodiments, the stator 1704 is non-rotationally mounted within the non-depicted housing assembly, is constructed at least partially of a magnetically permeable material, and is spaced apart from the rotor 1702. The magnetic sensor 1706, also similar to the previous embodiments, is non-rotationally mounted between the rotor 1702 and the stator 1704. However, unlike the previously embodiments, the magnetic sensor 1706 is disposed between central portions, rather than peripheral portions, of the rotor 1702 and stator 1704. In addition, the sensor PCB 124 is preferably sized and disposed differently than the previous embodiments.

The stator 1704, unlike the previous embodiments, does not have poles extending perpendicularly therefrom. Instead, the one or more pair of magnets 1708 extend perpendicularly therefrom. In the depicted embodiment, the sensor includes two pair of magnets 1708—a first pair of magnets 1708-1 and a second pair of magnets 1708-2—though it could include more or less than this number of pairs of magnets. The first pair of magnets 1708-1 includes a first magnet 1712-1 and a second magnet 1712-2, and the second pair of magnets 1708-2 includes a third magnet 1712-3 and a fourth magnet 1712-4. The first magnet 1712-1 is coupled to the stator and has its north magnetic pole (N) directed toward the stator 1704 and its south magnetic pole (S) directed toward the rotor 1702. The second magnet 1712-2 is also coupled to the stator 1704, but has its south magnetic pole (S) directed toward the stator 1704 and its north magnetic pole (N) directed toward the rotor 1702. The third magnet 1712-3 is coupled to the stator 1704 and is diametrically opposed to the first magnet 1712-1. Similar to the first magnet 1712-1, the third magnet 1712-3 has its north magnetic pole (N) directed toward the stator 1704 and its south magnetic pole (S) directed toward the rotor 1702. The fourth magnet 1712-4 is coupled to the stator 1704 and is diametrically opposed to the second magnet 1712-2. The fourth magnet 1712-4 has its south magnetic pole (S) directed toward the stator 1704 and its north magnetic pole (N) directed toward the rotor 1702. As FIG. 17 further depicts, the first and second magnets 1712-1, 1712-2 are radially offset from each other by a predetermined angular distance ($\theta$), as are the third and the fourth magnets 1712-3, 1712-4.

With the above-described embodiment, when the non-illustrated valve shaft 112 (and thus the non-illustrated valve element) is in a first position, such as a valve-closed position, the first and second rotor poles 302-1, 302-2 are aligned with the first and third magnets 1712-1, 1712-3, respectively, and are concomitantly offset from the second and fourth magnets 1712-2, 1712-4, respectively. As a result, the magnetic sensor 1706 detects a relatively large magnetic flux directed from the north poles (N) of the first and third magnets 1712-1, 1712-3, through stator 1704, in a first direction to the rotor, through rotor 1702, and back to the south poles (S) of the first and third magnets 1712-1, 1712-3. The magnetic sensor 1706 thus generates a relatively large magnitude voltage signal of a first polarity.

Figure 18:
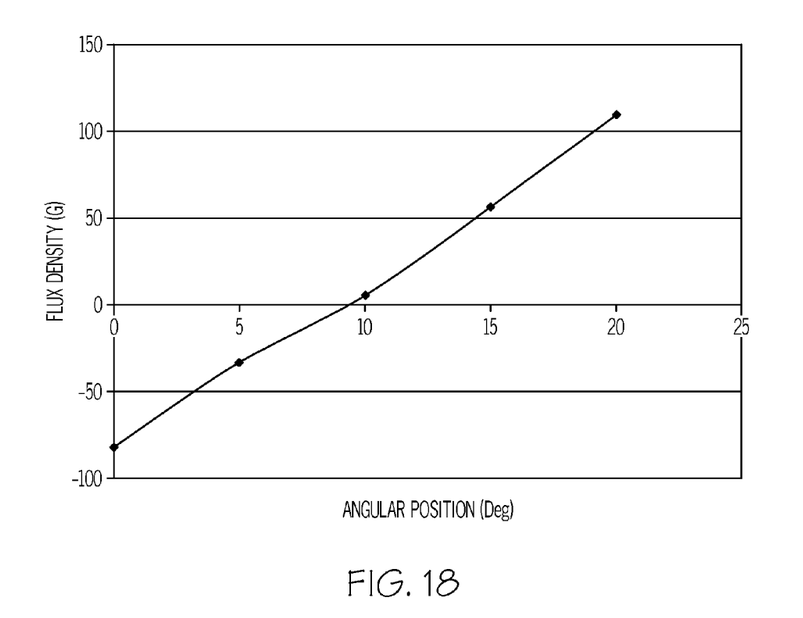
FIG. 18 graphically depicts the variations of the magnitude and direction of magnetic flux detected by a magnetic sensor implemented in the sensor of FIG. 17.

As the rotor 1702 is rotated from the first position toward a second position, such as a valve-open position, the first and second rotor poles 302-1, 302-2 are rotated out of alignment with the first and third magnets 1712-1, 1712-3, respectively, and into alignment with the second and fourth magnets 1712-2, 1712-4, respectively. As a result, the direction of the magnetic flux detected by the magnetic sensor 1706 gradually varies from the first direction to a second direction. Concomitantly, the magnitude of the voltage signal decreases to zero, and then begins to increase, but with a second polarity that is opposite the first polarity. This is because, as the rotor 1702 is rotated, magnetic flux is increasingly directed from the north poles (N) of the second and fourth magnets 1712-2, 1712-4, through rotor 1702, in the second direction to the stator 1704, through stator 1704, and back to the south poles (S) of the second and fourth magnets 1712-2, 1712-4. An example of how the magnitude and direction of the magnetic flux detected by the magnetic sensor 1706 may vary is graphically depicted in FIG. 18.

The voltage signals generated by the magnetic sensor 1706 may be supplied to the circuitry 150 (non-illustrated) mounted on the circuit board assembly 148 (also non-illustrated). The circuitry 150 processes the voltages signals and supplies a position signal representative of the position of the valve. The valve position signal may be used to indicate whether the valve is in the closed or a "not-closed" position (e.g., any open position), whether the valve is in the closed position or the full-open position, or whether the valve is in the closed position or any one of numerous open positions between the closed and full-open positions. It will be appreciated that the circuitry 150 may be configured to provide an indication of only discrete valve positions, or to provide a continuous indication of valve position as it is rotated between the closed and full-open position.

Figure 19:
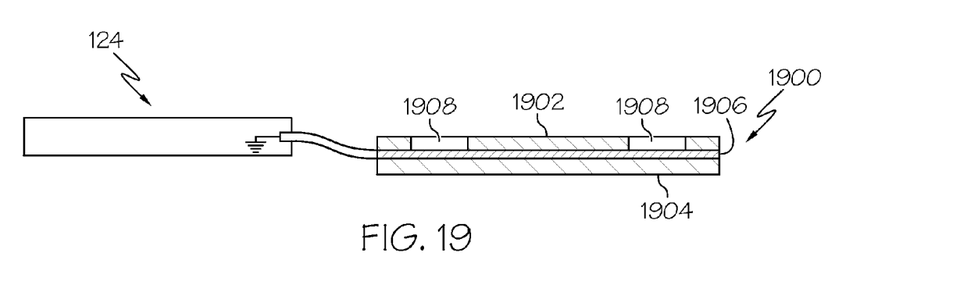
FIG. 19 depicts a simplified representation of a flexible circuit that may be implemented in the disclosed sensors.

Each of the embodiments described herein may be located in environments of relatively high electromagnetic interference (EMI). Thus, the embodiments may, if needed or desired, be implemented with the flexible circuit 1900 that is depicted in FIG. 19. The flexible circuit 1900 provides EMI shielding and includes a first flexible substrate 1902, a second flexible substrate 1904, and a conductor 1906 disposed between the first and second flexible substrates 1902, 1904. The first and second flexible substrates 1902, 1904 are formed of a flexible dielectric material such as, for example, a polyimide film. The conductor 1906 may be formed of any one of numerous conductors such as, for example, copper or gold.

When implemented with the embodiment depicted in FIGS. 1-5, the first substrate 1902 has one or more openings 1908 formed therein that are sized and shaped similar to the cross sections of the one or more stealer poles 406. The one or more stealer poles 406 may thus extend through the one or more openings 1908 and contact the conductor 1906. The conductor 1906 is preferably connected to circuit ground via, for example, the sensor PCB 124. Moreover, the stator 104 is electrically isolated from the housing 128 using a plurality of non-electrically conductive (e.g., plastic) bushings 1912 (see FIG. 2).

When the sensors 100, 1200, 1700 are assembled, the flexible circuit 1900 is disposed between the one or more magnetic sensors 108, 1208, 1706 and the divider plate 136. Any EMI currents that may be generated are shunted to ground, thereby minimizing capacitive coupling might otherwise interfere with the circuit signals.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A position sensor for sensing whether a rotatable element s in at least a first rotational position or a second rotational position, comprising:
    a rotor configured to be coupled to the rotatable element for rotation therewith to the first rotational position and the second rotational position, the rotor constructed at least partially of a magnetically permeable material and including a first rotor pole;

a non-rotationally mounted stator constructed at least partially of a magnetically permeable material, the stator spaced apart from the rotor and comprising a base, a first main pole, and a first secondary pole, the first main pole and the first secondary pole extending perpendicularly from the base and spaced radially apart from each other, the first main pole extending perpendicularly a first predetermined distance from the base toward the rotor, and the first secondary pole extending perpendicularly a second predetermined distance from the base toward the rotor, the second predetermined distance greater than the first predetermined distance;

a sensor printed circuit board (PCB) disposed between the rotor and the stator, the sensor PCB having a first side, a second side, an opening that extends between the first and second sides, and a pole slot that extends between the first and second sides, the first main pole extending at least partially into the pole slot, the first secondary pole extending completely through the pole slot;

a permanent magnet non-rotationally disposed adjacent to a central portion of the base of the stator and spaced apart from the rotor, the permanent magnet extending through the opening in the sensor PCB; and a first magnetic sensor non-rotationally mounted between the stator and the rotor, the first magnetic sensor disposed adjacent the first main pole and radially offset from the first secondary pole, wherein:

in the first rotational position, the first rotor pole, the first main pole and the first magnetic sensor are aligned, and in the second rotational position, the first rotor pole and the first secondary pole are aligned, and the first rotor pole and the first magnetic sensor are out of alignment.

2. The position sensor of claim 1, further comprising a housing assembly that houses the rotor, the stator, the magnet, and the first magnetic sensor, the housing assembly comprising:

a first housing section having a first end, a second end, and a divider plate disposed between the first end and the second end to define a rotor cavity and a stator cavity within the first housing section; and a second housing section coupled to the first housing section and having an inner surface that defines a second housing section cavity, wherein:

the rotor is disposed within the rotor cavity, the first magnetic sensor is disposed within the stator cavity, the magnet is coupled to the stator and is partially disposed within both the stator cavity and the second housing section cavity, and the stator is coupled to the housing and is partially disposed within both the stator cavity and the second housing section cavity.

3. The position sensor of claim 2, wherein:

the sensor PCB is coupled between the first housing section and the second housing section; and the sensor PCB has the first magnetic sensor coupled thereto.

4. The position sensor of claim 3, further comprising:

an electromagnetic interference shield disposed between the first magnetic sensor and the divider plate.

5. The position sensor of claim 1, wherein: the rotor includes a second rotor pole that is diametrically opposed to the first rotor pole;

the stator includes a second main pole and a second secondary pole; and the second main pole and second secondary pole are diametrically opposed to the first main pole and the first secondary pole, respectively.

6. The position sensor of claim 5, further comprising:

a second magnetic sensor non-rotationally mounted between the stator and the rotor, the second magnetic sensor disposed adjacent the second main pole and offset from the second secondary pole.

7. The position sensor of claim 6, wherein each of the first and second magnetic sensors is selected from the group consisting of a Hall sensor, an anisotropic magneto-resistive (AMR) sensor, a giant magneto-resistive (GMR) sensor, and a tunneling magneto-resistive (TMR) sensor.

* * * * *